Feb. 23, 1943.  J. J. JAKOSKY  2,311,757
THERMOMETRIC METHOD AND APPARATUS FOR EXPLORATION OF BORE HOLES
Filed Feb. 25, 1938  3 Sheets-Sheet 2
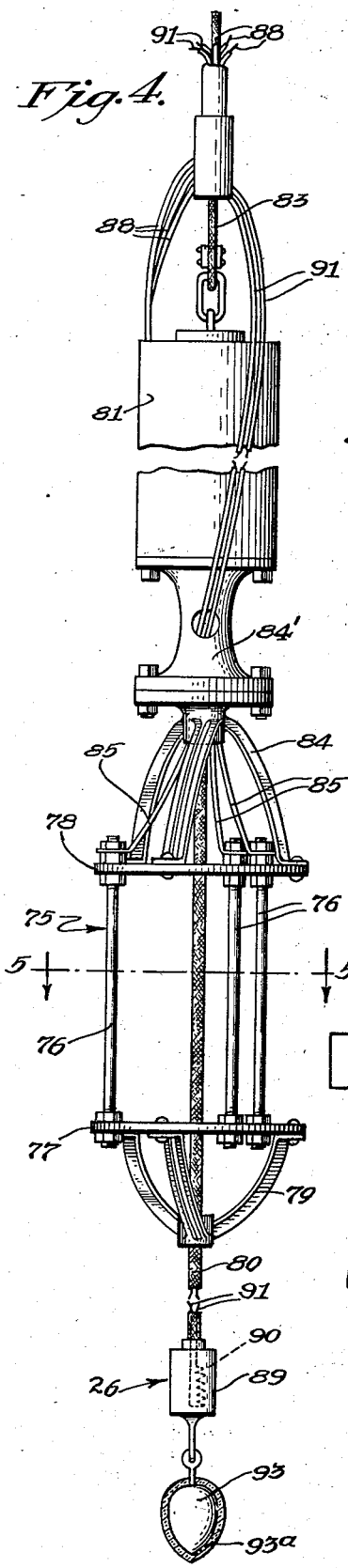
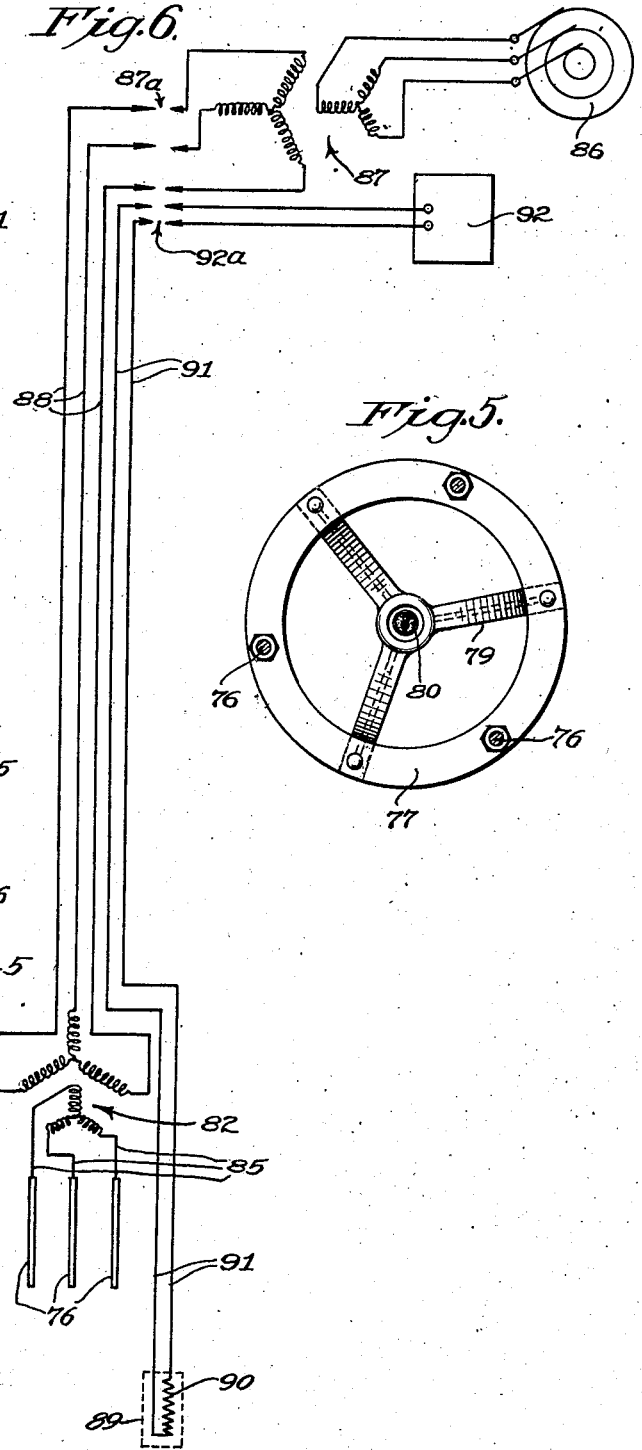
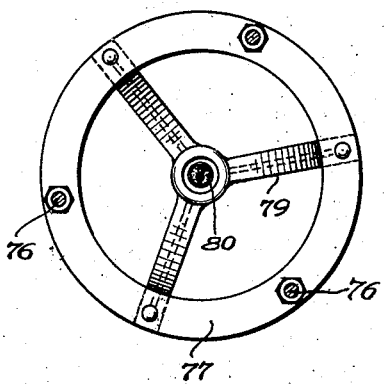
INVENTOR.
John Jay Jakosky,
BY Arthur P. Knight and
Alfred W. Knight
ATTORNEYS.

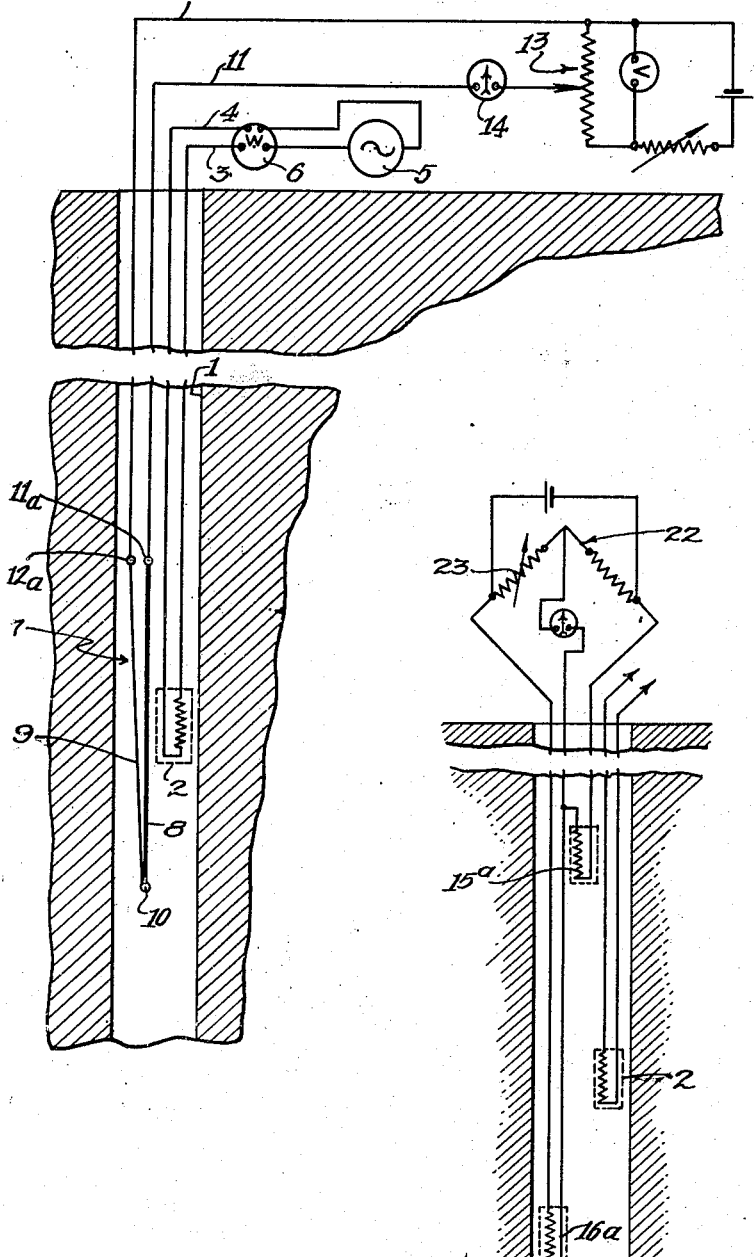

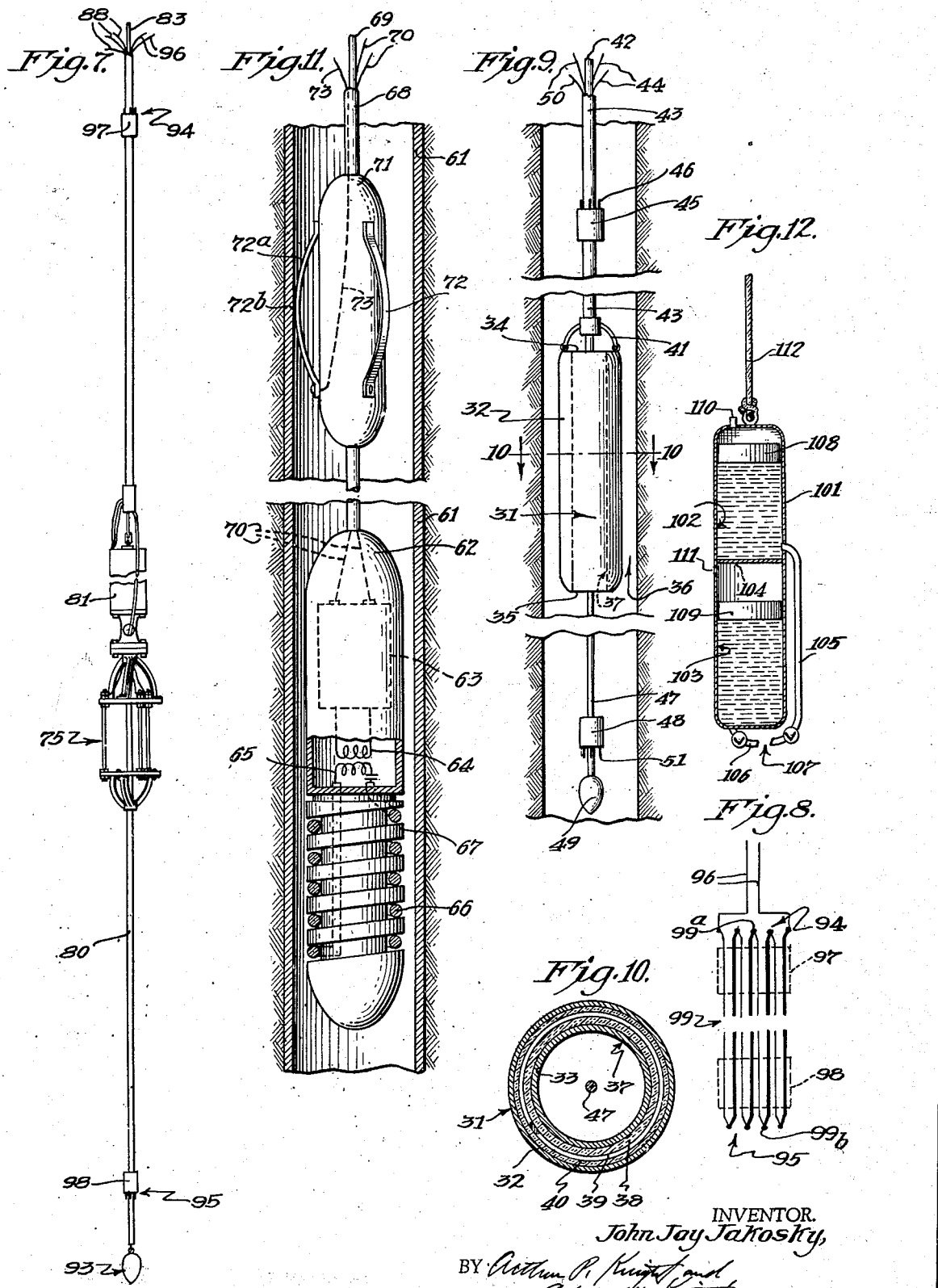

Patented Feb. 23, 1943

2,311,757

UNITED STATES PATENT OFFICE 2,311,757

THERMOMETRIC METHOD AND APPARATUS FOR EXPLORATION OF BOREHOLES

John Jay Jakosky, Los Angeles, Calif., assignor to Schlumberger Well Surveying Corporation, Houston, Tex., a corporation of Delaware Application February 25, 1938, Serial No. 192,544

4 Claims. (Cl. 73—51)

This invention relates to a method and apparatus for determining the geologic nature and characteristics of a geologic formation traversed by a bore hole, and pertains more particularly to a method and apparatus for determining the characteristics of such formations through the analysis of their thermal properties.

I have found that when heat is supplied to the material surrounding a bore hole, the surrounding material will absorb more or less heat in a given time according to the thermal characteristics such as the thermal diffusivity of such material. By making suitable temperature measurements valuable information concerning the nature and characteristics of the formation traversed by the bore hole may be obtained.

A particular object of the invention is to provide a method and apparatus for measuring a quantity influenced by the thermal diffusivity of the materials surrounding a bore hole so that the geologic nature and characteristics of the geologic formation traversed by the bore hole may be determined from the data so obtained.

Another important object of the invention is to provide a method and apparatus for determining the geologic nature and characteristics of a formation traversed by a bore hole through determining the relative thermal diffusivities of the materials surrounding the bore hole.

Another object of the invention is to provide an advantageous form of apparatus for supplying heat at a position within a bore hole and for measuring a quantity influenced by the thermal diffusivity of the material surrounding the bore hole.

According to this invention, in the simplest embodiment thereof, heat is supplied to a localized zone at a position within a bore hole and a quantity influenced by the thermal diffusivity of the materials surrounding the bore hole within said zone and adjacent the position of heat supply is measured, and the geologic nature and characteristics of the geologic formation traversed by the bore hole are derived from the data so obtained. More or less absolute values for the thermal diffusivity of the material surrounding the bore hole in the region at which heat is applied may be derived in this manner. I prefer, however, to supply heat within the bore hole to localized zones at successively different depths and to measure a quantity influenced by the thermal diffusivity of the materials surrounding the bore hole within the respective zones at the successive depths, so that the relative values of the thermal diffusivities of the materials at the different depths may be determined.

The apparatus of this invention may comprise a heater for supplying heat at a position within a bore hole and means for measuring a quantity influenced by the thermal diffusivity of the materials surrounding the bore hole adjacent the position at which heat is supplied within the bore hole. The heat may be supplied to the material surrounding the bore hole in various ways. For example, an electric heater may be lowered in the bore hole and heat may be supplied to the liquid in the bore hole by this heater. As another example, the heat may be supplied directly to the walls of the bore hole or directly to the casing in cased holes through a heating element which is in contact with the walls of the hole or the casing or closely adjacent thereto, or the heat may be supplied by induction from a concentrated electric field source positioned within the bore hole; or, as another example, the heat may be supplied through chemical reaction, by mixing suitable reagents at a position within a bore hole.

Measurements according to this invention are all based in one way or another upon the temperature at a known depth, and preferably at each of a plurality of different depths, within the bore hole, resulting from the supplying of heat at such depth or depths and the diffusion of such heat to the surrounding materials. Such measurements may be obtained in numerous ways and due to the convenience of taking readings at the surface of temperatures at relatively great depths I find it preferable to utilize electrical temperature measuring instruments, although it is conceivable that other types of temperature measuring instruments may be lowered to different depths within the bore hole to provide the required temperature record. Thus I may provide a thermocouple having a hot junction at one depth in the bore hole and a cold junction at another depth in the bore hole so that the thermal E. M. F. produced by such a thermocouple will be indicative of the temperature difference between the different depths. Suitable leads are connected to the thermocouple and to a potentiometer or other instrument, such as a micro-ammeter, on the surface, and the difference in temperature may be directly ascertained from the readings of the potentiometer or other instrument.

A resistance thermometer may be substituted for the thermocouple and one or more resistance elements may be positioned in the bore hole at different depths, and each element may be connected to a separate bridge circuit so that the adjustments required for balance of each bridge may be used as an indication of the temperature of the respective resistance elements. If it is desired to directly obtain the temperatures at two different depths, two separate bridge circuits may be used; while if it is desired to obtain the ratio of the temperatures at two different depths, a single bridge circuit may be used and each of the resistance elements may be connected in a separate arm.

A simple form of the apparatus may comprise a heating element and a temperature-responsive device located at a fixed distance from one another and arranged to be raised or lowered in the bore hole. The heating element may comprise an electrical or other form of heater and the temperature-responsive device may comprise a resistance thermometer bulb which is connected to a measuring circuit on the earth's surface. With such an apparatus arrangement, the temperature-responsive device is preferably located below the heating element so that an initial temperature record may be obtained as the apparatus is lowered into the bore hole. The electric heater may then be set in operation and a second temperature record may be obtained as the apparatus ascends the bore hole. The differences in temperature as measured between the ascent and descent of the apparatus may be used as a measure of the differences in thermal characteristics of the materials surrounding the bore hole at the different depths.

As another example, temperature-responsive elements may be positioned at known distances above and below the heating element and moved simultaneously therewith. One of the temperature-responsive elements will assume the temperature of the portion of the bore hole which has not been subjected to heating and the other of the temperature-responsive elements will assume the temperature of the portions of the bore hole which have been heated a short time before by the heating element, and variations in the thermal diffusivity of the geologic formation traversed by the apparatus in the bore hole may be determined by measurements involving the temperatures of the heated and unheated portions of the bore hole at the different depths. In case the power dissipation of the heater, the velocity of movement thereof, and the relative disposition of the heater and temperature-responsive elements are maintained constant, the relative thermal properties of the strata traversed by the apparatus may be directly ascertained from the temperatures of the temperature-responsive elements taken at the different depths.

The temperatures of the heated and unheated portions of the bore hole may be measured separately and directly at the different depths, or the difference in the two temperatures may be measured directly, or the ratios of the two temperatures may be measured directly. These measurements are preferably made continuously as the heating element and the two temperature-responsive elements are moved simultaneously to different depths in the bore hole. It is also preferable to make a continuous record of the movement of the various elements in the bore hole as well as the rate of power dissipation of the heating element so that a more complete and accurate record may be obtained.

It will be appreciated that the apparatus for taking the measurements involving temperatures at different depths in the bore hole is not necessarily calibrated directly in terms of temperature, temperature difference, or temperature ratio, and it is to be understood that in the ensuing description and in the appended claims statements involving the measurement of temperatures are to be construed as broad enough to include measurement of any quantity which is influenced by the temperature at one or more positions within the bore hole or any quantity influenced by the thermal diffusivity of the materials surrounding the bore hole.

It will also be appreciated that the presence of the casing will have little effect on the results obtained by this method since the mass and specific heat of the casing is very small compared to the mass and specific heat of the fluid in the bore hole and of the surrounding materials.

Further objects and advantages of the invention will either be brought out specifically in the following description or will be apparent therefrom.

I have illustrated apparatus arrangements and several forms of apparatus according to my invention in the accompanying drawings, and referring thereto:

Fig. 1 is a diagrammatic representation of one form of apparatus according to my invention, in position in a bore hole;

Fig. 2 is a view corresponding in general to Fig. 1 showing an arrangement for obtaining temperatures at two positions within a bore hole;

Fig. 3 is a view corresponding in general to Fig. 2 showing an apparatus arrangement for obtaining the ratio of the temperatures at two positions within a bore hole;

Fig. 4 is a partly broken-away side elevation of an advantageous form of apparatus according to my invention;

Fig. 5 is a view thereof taken on line 5—5 in Fig. 4, illustrating the construction of the heating element;

Fig. 6 is a wiring diagram for the apparatus shown in Fig. 4;

Fig. 7 is a side elevation illustrating a modified arrangement of the temperature-responsive devices and the heating element;

Fig. 8 illustrates a thermocouple arrangement which may be used with the apparatus shown in Figs. 1 and 7;

Fig. 9 is a side elevation, illustrating a modified form of heating element;

Fig. 10 is a sectional detail of the heating element taken on line 10—10 in Fig. 9;

Fig. 11 is a partly broken-away side elevation illustrating a further modified form of heating element and temperature-responsive device; and Fig. 12 is a partly diagrammatic view of a form of apparatus for supplying heat chemically at different depths within the bore hole.

Referring to Fig. 1, the walls of a bore hole are shown at 1, and a heating element 2 is shown positioned within the bore hole and connected through suitable insulated leads 3 and 4 to a power source 5 which may be the conventional alternating current supply lines or may be an engine-driven generator or the like. A wattmeter 6 is shown connected between the power supply 5 and the heating element 2 in the leads 3 and 4 so that the power dissipated by the element 2 may be measured.

The heating element 2 may comprise a resistance element surrounded by a suitable insulating casing and may be one of the many types of immersion heaters which are commercially available. A preferred type of heater will be described subsequently in relation to Figs. 4 through 7. It may be assumed for the purpose of description that the heater 2 is disposed substantially centrally of the bore hole and that heat from this heater may be imparted to the materials surrounding the bore hole in a relatively short time as the heater is moved to different depths.

A thermocouple is shown at 7 and may comprise, for example, a length of constantan wire 8 and another length of copper wire 9 which are connected together to form a junction 10 which is shown positioned in the bore hole below the heater 2. Insulated conductors, such as copper wires, 11 and 12 are connected to the respective constantan and copper wires 8 and 9 and to a potentiometer 13. A galvanometer 14 is shown connected in the lead 11 for indicating zero current in this conductor. The conductors 11 and 12 are connected to the thermocouple wires 8 and 9 at 11a and 12a, and the connections 11a and 12a comprise the other junction of the thermocouple 7 so that the E. M. F. generated by the thermocouple 7 will be a function of the difference in temperature between the junction 10 and the junctions defined by connections 11a and 12a. Suitable means, not shown, may be employed for simultaneously moving the thermocouple 7 and the heating element 2 to different depths in the bore hole, preferably at the same uniform rate. It will be understood that the survey assembly including the heating element and the temperature measuring means will ordinarily be mounted on a cable containing the necessary connecting wires for connection to the equipment at the surface, and that any suitable means may be employed for raising and lowering the cable in the bore hole and for measuring the length of cable passed into the hole so as to provide an indication or record of the position of the apparatus in the hole.

It may be assumed that the apparatus is descending the bore hole at a known, constant, and moderate rate of speed, and that the apparatus is immersed in the fluid which is normally present in the bore hole. Successive volumes of the fluid in the bore hole are heated as the heating element descends and the heat contained in these volumes or localized zones of fluid is transferred in part to the materials surrounding the bore hole. The materials surrounding the bore hole in successive localized zones are thus heated and this heat will tend to diffuse outwardly of the bore hole. Since different materials have different thermal diffusivities, heat will be transferred into the surrounding materials at different time rates at different depths in the bore hole. The junction 10 of the thermocouple is shown in a position leading the heating element, so that the temperature of the fluid contacted by the junction 10 at any position in the hole will not be influenced appreciably by the heat supplied by the heating element, but will be substantially the normal temperature in the bore hole at that position. The junction defined by connections 11a and 12a is shown in a position lagging the heating element and since it is in contact with the fluid in one of the localized zones heated by the heating element, its temperature at each position in the hole will be dependent upon the rate of heat dissipation of the heating element, the thermal diffusivity of the material surrounding the bore hole in that zone, and the length of time elapsed since the heat was supplied at that position or zone by the heating element. Thus by knowing the rate of descent of the apparatus, the rate of power dissipation as indicated by the wattmeter 6, and the relative position of the junctions 11a and 12a, with respect to the heating element 2, the differential temperatures as indicated by the potentiometer 13 may be used as a basis for differentiating between the various strata traversed by the apparatus in the bore hole. In order to facilitate the correlation and computation of the data, the wattmeter 6 and potentiometer 13 are preferably of such known constructions as to give a continuous record of their indications versus depth.

It will be understood that measurements may be taken as the apparatus is either lowered or raised to different depths in the drill hole; in either case, the thermocouple junction which leads the heating element will be responsive to variations in normal temperature of the fluid in the hole, while the junction which lags the heating element will be responsive to the temperature of the heated fluid, which is in turn influenced by the thermal diffusivity of the surrounding materials.

In Fig. 2 the heating element 2 is shown positioned within a bore hole and in contact with the contained fluid, and suitably enclosed resistance thermometer elements are shown at 15 and 16 at positions above and below the heater. Connections to the heater are shown at 3 and 4, and the power supply and the wattmeter have been omitted. The resistances 15 and 16 are each connected across one arm of bridges 17 and 18, respectively, which may have a common power source 19. The bridges 17 and 18 are each shown as provided with adjustable arms 20 and 21, respectively. The resistance of elements 15 and 16 may be many times the resistance of the connecting leads, and they may be wound with a material, such as copper, nickel or platinum, which has a high temperature coefficient so that small differences in temperature will produce appreciable changes in resistance. Thus the resistance of the variable arms 20 and 21 required to balance the respective bridges may be used to indicate the temperatures of the respective resistance elements. In order to obtain a complete record of the temperature changes, the bridges 17 and 18 are preferably automatically recording. This arrangement of apparatus may be used in exactly the same manner as the apparatus shown in Fig. 1.

A modified form of apparatus is shown in Fig. 3 and corresponds in general to that shown in Fig. 2, except that resistance elements 15a and 16a each comprise an arm of a single bridge 22 which has a variable arm 23. With this arrangement the ratios of the temperatures at 15a and 16a may be indicated by the relative adjustment of the arm 23 required to balance the bridge 22.

It is well known that water has a relatively low thermal diffusivity and without convection it would require considerable time for heat to travel from the center of the bore hole to the walls thereof. Convection plays an important role in lessening the time required to distribute the heat throughout the fluid contained in the hole. I prefer to so construct my apparatus as to facilitate these convection currents, or cause turbulence or mixing of the bore-hole fluid, or to supply the heat in such manner as to distribute it in the fluid, as the system is moved in the bore hole.

Referring to Figs. 4 through 6, a preferred form of apparatus is shown as comprising a heating element 75 and a temperature-responsive element 26. The heating element 75 is shown as comprising electrodes 76 of conducting material such as iron which are held in spaced relation in insulating rings 77 and 78. A spider 79 depends from the ring 77 and acts to center a cable 80 leading to the temperature-responsive element 26. A transformer housing is shown at 81 for a transformer 82 and a hoisting cable 83 is shown connected to the upper end of the housing 81 and a supporting spider 84 is shown depending from the lower end of the housing 81 and secured to the insulating ring 78. Electrical leads 85 are shown connected to the respective electrodes 76 and leading into the transformer housing 81 for associating the respective electrodes with the transformer 82.

For the purposes of efficiency and convenience I have shown a three-phase power supply 86 connected through a transformer 87 and conventional slip ring contacts 87a to electrical leads 88 which are connected to the transformer 82. Medium high voltage may be used for transferring the power from the transformer 87 to the transformer 82 so that relatively small cables may be used for the leads 88. The transformer 82 then supplies relatively low voltage, high amperage current to the electrodes 76. The heat supplied by the heater 75 will result from the passage of current through the fluid in the bore hole between the electrodes 76 and as a consequence will tend to provide a uniform heat distribution.

The temperature-responsive element 26 is shown as comprising an enclosing bulb of high thermal conductivity 89 containing a resistance element 90 connected to leads 91 carried in the cable assembly 80. The cable 80 may be supported by spider 84 or by the member 84' which connects said spider to the transformer housing 81, and the leads 91 may be carried upwardly past the transformer housing, with suitable insulation, and thence to the surface along with the leads 88. The leads 91 are shown connected to a temperature-measuring device 92 through the slip ring contacts 92a. The temperature-measuring device 92 may correspond to either of the bridges 17 or 18 shown in Fig. 2, for example. A weight is shown at 93 depending from the resistance bulb 89 for centering the resistance bulb in the bore hole. A heat-insulating cover 93a is shown surrounding the weight 93 to prevent thermal disturbances due to the heat-absorbing ability of the weight 93.

It will be appreciated that the transformer 82 may be omitted and that larger leads may be substituted for the leads 88 to carry the heavy current into the bore hole. It will also be appreciated that it is not necessary to use a polyphase generator at 86, but that a single-phase generator may be substituted therefor, with suitable modification of the electrode arrangement in the heating element.

In operation the entire assembly is lowered into the bore hole and a record is made of the temperatures existing at the various depths in the bore hole. Current is then supplied to the heater 75 and the apparatus is raised in the bore hole at a known or uniform rate and a second record of the temperatures at the various depths in the bore hole is made. The thermal and geologic characteristics of the formation traversed by the bore hole may then be ascertained from the differences of these data at the various depths.

A modified form of the apparatus shown in Figs. 4 through 6 is illustrated in Fig. 7, in which temperature-responsive elements 94 and 95 are shown positioned respectively above and below the heating element 75. The elements 94 and 95 may comprise resistance thermometer bulbs as shown in Figs. 2 through 6 or they may comprise junctions of one or more sets of thermocouples. Leads are shown at 96 for connecting the thermocouple or thermocouples to the temperature measuring instrument, which instrument may comprise a potentiometer as shown in Fig. 1. Suitable supports are shown at 97 and 98 for holding the respective temperature-responsive elements 94 and 95 in position. In the event that a single thermocouple does not give sufficient sensitivity to the apparatus, a plurality of thermocouples may be used, connected in series. Referring to Fig. 8, a plurality of thermocouple leads are shown at 99 providing junctions at 99a and 99b and forming the respective temperature-responsive elements 94 and 95. In the event that a plurality of thermocouples is used as shown in Fig. 8, the cable 80 would necessarily carry more than the two leads shown in Fig. 4.

Referring to Figs. 9 and 10, a heating element is indicated generally at 31 and is shown as comprising a substantially cylindrical outer casing 32 and an inner casing 33 of heat-conducting metal which may be joined together at the upper and the lower ends 34 and 35 thereof to form an enclosed annular chamber between said casing members and an open-ended passage 37 extending through the element 33. The walls 32 of the heating element 31 are shown spaced a short distance from the walls of the bore hole as indicated at 36 and the inside diameter of the inner casing member 33 is preferably large so that the maximum amount of fluid will flow through the passage 37. A layer 38 of electrical insulating material is shown in the annular chamber in position surrounding the member 33, and a coil of resistance wire forming a heat-dissipating unit is shown at 39 wound on the insulating core 38. A layer 40 of insulating material is shown between the coil 39 and the outer wall 32. With such an arrangement the fluid in the bore hole is exposed to maximum heating and it is not necessary for heat to travel for large lateral distances, tending to produce equilibrium heat conditions in a short time. The construction shown will tend to produce a turbulent fluid flow and thorough mixing of the heated and unheated portions of the fluid. However, suitable deflectors or protuberances may be provided on the members 32 and 33 to increase turbulence, as will be apparent to those skilled in the art.

A suitable bail is shown at 41 attached to the heating element 31 and to a supporting cable 42 which is carried in a cable assembly 43 comprising heater leads 44 which are connected to the resistance element 39. A thermocouple junction support 45 is shown carried by the cable assembly 43 in a position above the heating element 31 and provided with thermocouple junctions 46. A cable 47 is shown extending through the passage 37 and carrying at its lower end a thermocouple junction support 48 positioned below the heating element 31 and provided with junctions 51, said cable being provided with the necessary leads for connection to the resistance winding 39 and to the thermocouple junctions 51. A weighted member 49 is shown carried by the cable 47 in order to position the thermocouple support 48. Thermocouple leads to the surface measuring instrument are shown at 50 in the cable assembly 43.

In Fig. 11 an arrangement is shown for heating the walls or the casing of the bore hole, preferably the casing, with induced and preferably high-frequency current. A bore hole casing is indicated at 61 and a sealed bomb 62 is shown suspended within the casing and containing a high-frequency, high-powered oscillator represented diagrammatically at 63 provided with an output coupling coil 64 which is coupled to an output coil 65 connected to a solenoid winding 66 which is wound on a suitable insulating core 67 of ceramic material, for example, secured to and supported by the bomb 62. A cable assembly is shown at 68 and may comprise a supporting cable 69 for raising or lowering the bomb 62 and power leads 70 which may connect a source of power to the oscillator 63. By proper design and calibration, the power input as measured in the leads 70 may be used as an indication of the power dissipated by the solenoid 66 in heating the casing 67 and the materials surrounding the bore hole. A support 71 for a temperature-responsive element is shown positioned above the bomb 62 and carried by the cable 69. Spring arms are shown at 72 for centering the support in the bore hole and maintaining firm sliding contact with the casing.

One or more of the arms 72, for example, the arm 72a, may be formed of a metal such as constantan, which has a high thermoelectric potential with respect to the metal of the casing. Thus the point of contact 72b between the casing 61 and the arm 72a will comprise a thermocouple junction and a single lead 73 of the metal of the arm 72a may be used as a lead to a similar constantan contact arm which engages the casing and is carried in a support member (not shown) comparable to the member 71 and located above said member 71. In accordance with the well-known laws of thermocouples, the lead 73 may be broken at any point and two conductors of copper, for example, may be connected thereto and connected to a measuring instrument located on the earth's surface. The portion of the casing between the two thermocouple junctions thus becomes a part of the electrical circuit and also acts as one element in the thermoelectric couple. With this arrangement I prefer to position the temperature-responsive elements above the heating element so that it will not be necessary to bring the temperature measuring leads in close proximity to the high frequency field.

Referring to Fig. 12, an apparatus arrangement is shown for supplying heat chemically at different depths in a bore hole. The apparatus is shown as comprising an elongated tank 101 which is divided into two compartments 102 and 103 by a centrally disposed partition 104. Valved fluid outlet lines 105 and 106 are provided adjacent the bottoms of the respective compartments 102 and 103, and are arranged to discharge the respective fluids contained in these compartments at a position designated as 107. Loose fitting pistons 108 and 109 are provided in the upper ends of the compartments 102 and 103 and vents are provided at 110 and 111 to allow fluid entrance into the upper ends of the chambers 102 and 103 as the pistons 108 and 109 move downwardly. A cable is shown at 112 for raising and lowering the tank 101 in the bore hole.

The portions of the compartments 102 and 103 beneath the respective pistons 108 and 109 each may be filled with a suitable reagent such as an acid and a base, and the valves on the supply lines 105 and 106 may be adjusted to mix the reagents in the correct proportions and quantities to give the required heat. The tank 101 may then be lowered into the bore hole at a given rate to supply heat at different depths in the bore hole. As the reagent level is lowered in each of the compartments, the pistons will be lowered and the drill-hole fluid will flow into the compartments through the vents 110 and 111 and will not become mixed with the reagent. Suitable temperature-responsive instruments may be placed either above or below the heater as with the previously described embodiments of the invention.

I prefer to move the heating element and the temperature-responsive elements simultaneously and to maintain a fixed separation between the respective elements; however, surveys may be satisfactorily performed without such movement and without maintaining a fixed separation between the various components. For example, both of the temperature-responsive elements may be located at points above or below the heating element where the walls of the bore hole have received heat in order to measure the temperature gradients, according to whether the heating element is descending or ascending the bore hole.

It is also possible, when using thermocouples, to station the cold junction of the thermocouple at a given position in the bore hole or on the surface where the temperature remains constant and to move the heating element and the other junction of the thermocouple along the bore hole at the same or different rates. Other arrangements of the temperature-responsive devices and the heating element will become apparent to those skilled in the art, and such arrangements and procedures will depend to a large extent upon the local conditions encountered and need not be detailed herein.

Numerous changes in construction, procedure, and forms of measurement will become apparent to those skilled in the art, and I do not choose to be limited to the above illustrative examples, but rather to the scope of the appended claims.

I claim:

1. The method of determining the geologic nature and characteristics of a geologic formation traversed by a bore hole, which comprises: moving a source of heat longitudinally through the bore hole to supply heat at successively different depths therein, and successively obtaining indications of the difference in temperature between an unheated portion of the bore hole located a fixed longitudinal distance in advance of said heat source, said distance being such that the temperature of said unheated portion is not influenced appreciably by the heat supplied by said heat source, and a heated portion of the bore hole located a fixed longitudinally distance behind said heat source, whereby the geologic nature and characteristics of the geologic formation traversed by the bore hole may be determined from the data so obtained.

2. An apparatus for use in determining the geologic nature and characteristics of a geological formation traversed by a bore hole, which comprises: a support adapted to be lowered into a bore hole, an electric heating element mounted on the support and including a plurality of spaced electrodes for supplying heat to localized zones in the bore hole; temperature responsive means mounted on the support at spaced, fixed distances above and below said heating element and movable therewith as a unit for measuring the temperatures in said zones before and after the application of heat thereto, said temperature-responsive means including a temperature-responsive element longitudinally spaced from the heating element by a distance such that upon such movement with said temperature-responsive element leading the heating element, the temperature at said temperature-responsive element is not influenced appreciably by heat supplied by said heating element; a three phase source of electrical energy at the surface of the earth; a three-phase voltage step-up transformer connected to said source; a voltage step-down transformer in the bore hole and connected to said heating element; an electrical circuit connecting said step-down transformer in the bore hole with said step-up transformer at the surface of the earth; and indicating means connected to said temperature responsive means, whereby indications of the relative thermal properties of the formations surrounding the bore hole may be obtained.

3. An apparatus for use in determining the geologic nature and characteristics of a geologic formation traversed by a bore hole, which comprises: a support adapted to be lowered into a bore hole; an electric heating element mounted on said support for supplying heat to a localized zone in the bore hole; a thermocouple mounted on said support, and having junctions disposed longitudinally above and below said heating element and in fixed spatial relation thereto such that upon movement of said heating element and thermocouple to different depths in a bore hole, one of said junctions is subjected to the increased temperature in a heated zone behind the heating element, while the other junction is subjected to the substantially unmodified bore hole temperature; means for moving said heating element, said thermocouple and support as a unit to different depths in a bore hole; means for supplying electrical energy to said heating element; and measuring means connected to said thermocouple.

4. An apparatus for use in determining the geologic nature and characteristics of a geologic formation traversed by a bore hole, which comprises: a support adapted to be lowered into the bore hole; an electric heating element mounted on the support and including a plurality of spaced electrodes for supplying heat to a localized zone in the bore hole; temperature-responsive elements mounted on said support at fixed, longitudinal distances above and below said heating element such that upon movement of said temperature-responsive and heating elements to different depths within a bore hole, one of said temperature responsive elements is subjected to the increased temperature in a heated zone behind the heating element while the other temperature-responsive element is subjected to the substantially unmodified bore hole temperature in advance of the heating element, the longitudinal spacing of said other temperature-responsive element from the heating element being such that the temperature of the fluid contacted thereby upon such movement is not influenced appreciably by the heat supplied by said heating element; means for moving said heating element, said temperature-responsive elements and support as a unit to different depths within a bore hole and in contact with the fluid contained therein; means for supplying electrical energy to said electrodes to cause an electric current to flow therebetween and heat said fluid; and means responsive to the differences in temperature between said temperature-responsive elements.

JOHN JAY JAKOSKY.